Oct. 16, 1934.  D. C. MACKINTOSH  1,977,341
MACHINE TOOL
Filed May 28, 1932
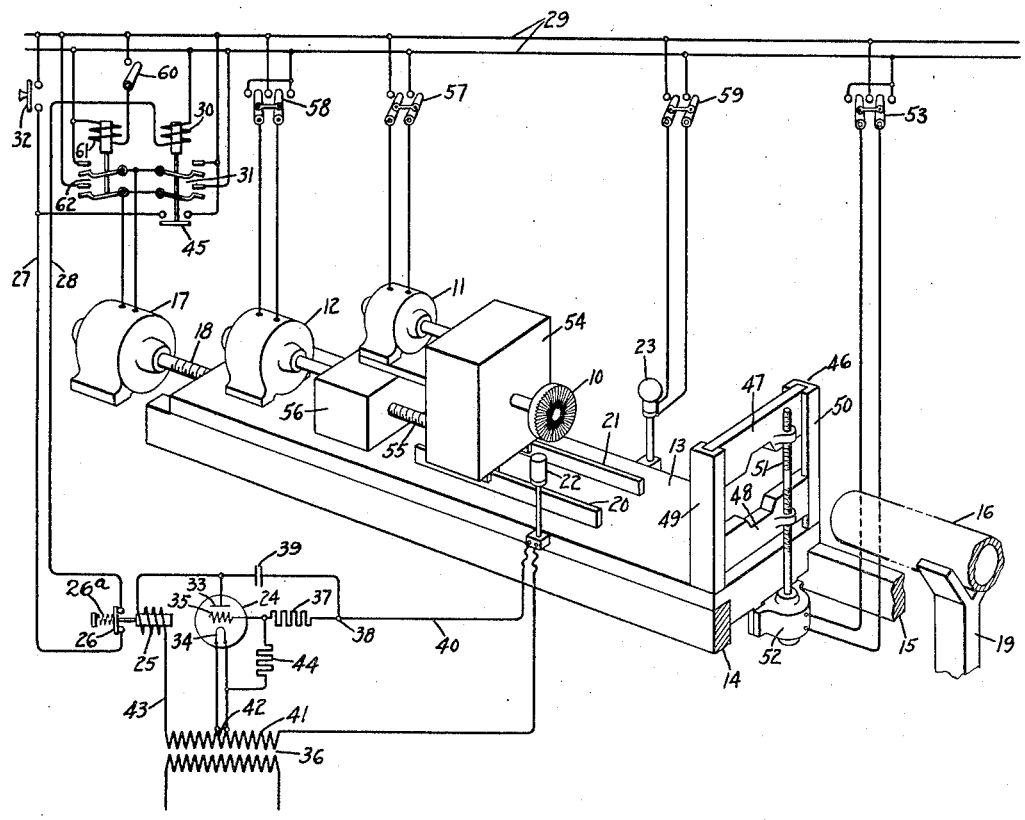
Inventor:
Donald C. Mackintosh,
by Charles E. Tullar
His Attorney Patented Oct. 16, 1934

1,977,341

UNITED STATES PATENT OFFICE

1,977,341

MACHINE TOOL

Donald C. Mackintosh, Schenectady, N. Y., assignor to General Electric Company, a corporation of New York Application May 28, 1932, Serial No. 614,237

4 Claims. (Cl. 90—21)

My invention relates to machine tools and has for its object the provision of means for accurately positioning the tool with respect to the work.

My invention has particular application to tools for machining relatively large or heavy work pieces which are difficult to position accurately with respect to the tool. Consequently means are provided for giving the tool a relatively rapid traverse movement to a desired position in close relation with the work piece, from which position the tool may be advanced in the usual manner into engagement with the work to carry out the desired machine operation. An example of this is a tool for facing the ends of heavy pipe. It is a particular object of my invention to automatically control the rapid traverse movement of the tool so that the tool is brought quickly and accurately to a predetermined position close to the work piece.

In carrying out my invention I provide a light-sensitive device and a source of light therefor which are mounted in a predetermined spaced relation with respect to the tool in such position that the source of light is intercepted by the work piece to vary the speed of advance of the tool, more specifically to stop the rapid traverse movement when the tool arrives in a predetermined position with respect to the work piece.

For a more complete understanding of my invention reference should be had to the accompanying drawing, the single figure of which shows in diagrammatic form a pipe-facing machine embodying my invention.

Referring to the drawing, I have shown my invention in one form as applied to a machine for facing the ends of heavy metal pipes. As shown, the milling or facing tool 10 with its driving motor 11 and slow traverse motor 12 are mounted on a carriage 13 which in turn is suitably supported on parallel rails 14 and 15 so that it can be moved on the rails to bring the tool into a predetermined position close to the end of the pipe 16. This traverse movement of the carriage 13 on the rails is comparatively rapid and is effected by means of a driving motor 17, shown as having a screw shaft 18 which engages with a suitable nut fixed to the carriage.

The pipe 16, only a short section of which is shown, is placed by means of a crane or other suitable handling means not shown on suitable supports 19, only one of which is shown, in front of the carriage 13. The pipe is held on the supports 19 in such a position laterally and at such height that the left-hand end as viewed in the drawing will be engaged by the facing tool 10 when the tool is moved forward in a direction parallel with the rails 14 and 15. When the pipe is placed on the support the carriage 13, and with it the facing tool, stands in a retracted position, to the left as viewed in the drawing. This permits the pipe to be placed in position on the support 19 without interference from the tool. In performing the facing operation the carriage 13 is first moved rapidly forward by means of the motor 17 to a predetermined position near the end of the pipe, after which the tool 10 is further advanced slowly on rails 20 and 21 on the carriage by means of the motor 12 to engage the end of the pipe, the tool being meanwhile rotated by the motor 11 to perform the facing operation.

In order to accurately stop the motor 17 with the facing tool 10 in the desired predetermined position with respect to the pipe, a suitable light-sensitive device, shown as a photo-electric cell 22, and a suitable light source 23, such as an incandescent lamp, are mounted on the carriage 13 on opposite sides of the carriage and a suitable predetermined distance in front of the facing tool. The light source 23 comprises a suitable source such as an incandescent lamp which is mounted in a casing (not shown) with an aperture to direct a beam of light normally upon the light-sensitive device 22. The light-sensitive device 22 and the light source 23 are so positioned on the carriage that the beam of light passes across the carriage substantially at right angles thereto and at such height as to substantially intersect the axis of rotation of the tool 10. The beam of light is, furthermore, placed a predetermined distance in front of the tool equal to the desired distance of the tool from the end of the pipe for this preliminary adjustment of the tool.

The light-sensitive device 22 is electrically connected in the input circuit of a three-element, electron discharge device, amplifier tube 24, the output circuit of which is connected to an operating coil 25 operating a bridging contact switch 26. The switch 26 is in turn connected in circuit through the conductors 27 and 28 to a suitable electrical supply source 29, shown as a direct-current source, an operating coil 30 for a switch 31 being included in the circuit together with a push-button switch 32. The switch 31 controls the connections between the armature of the motor 17 and the supply source 29. The bridging switch 26 is biased to an open position by means of a spring 26a to deenergize the coil 30, but the switch 26 is normally held in closed position as shown in the drawing by the light-responsive device as long as it is activated by a beam of light from the light source 23.

Although any suitable electric discharge device may be used, preferably the device 24 is a three-element vapor electric discharge device or Thyratron discharge device which is characterized by a large power output controllable by a small amount of grid energy. As is well known in the art the sealed envelope of the device contains a small quantity of inert gas, such as a mercury vapor, whereby the device becomes an arc rectifier or electric valve, its arc formation between the anode or plate 33 and the cathode or filament 34 being controlled by a grid 35. It will be understood that at certain critical values of grid voltage when the anode is positive the arc will start and will continue thereafter independently of the grid voltage as long as the anode is positive. On the other hand, when the grid voltage is more negative than its critical voltage value at which the arc starts, the arc is prevented from starting and no current will flow.

In the arrangement shown the electric discharge device is energized from a suitable source of alternating current through a transformer 36. The photo-electric cell 22 is suitably connected in the grid circuit of the device so as to vary the phase of the grid voltage with respect to the anode voltage and thereby control the starting of the arc. As shown, the grid 35 is connected through a resistance 37 to a point 38 from which a connection is made through a condenser 39 to the plate or anode 33 and through a conductor 40 and the photo-electric cell 22 to one terminal of the secondary winding 41 of the transformer 36. Preferably, the point 38 is connected directly to the cathode of the photo-electric cell. The cathode 34 of the electric discharge device is energized from a small central section 42 of the secondary winding 41. A connection is made from the opposite terminal of the winding 41 through a conductor 43 and the operating coil 25 to the anode 33. A grid leak resistor 44 may be provided although this resistance and also the resistance 37 may not be indispensable. This system for shifting the grid voltage of the electric discharge device 24 in order to control its operation is substantially as described and claimed in Patent No. 1,832,707 to Hull dated November 17, 1931.

In the operation of the photo-electric control system when the photo-electric cell 22 is exposed to light from the source 23 the resistance of the photo-electric cell is greatly decreased and the grid voltage of the discharge device 24 is thereby shifted to produce operation of the discharge device whereby a pulsating current is caused to pass through the operating coil 25. The coil thus energized closes the switch 26 and holds it in closed position so that when the push button 32 is closed the coil 30 is closed and the switch 31 closed. When the light from the source 23 is interrupted and the photo-electric cell thereby darkened, its resistance increases whereupon the discharge device 24 ceases to operate and the coil 25 is deenergized. This allows the switch 26 to be opened by the biasing spring 26a whereby the motor switch 31 is opened. When the switch 31 is closed a holding circuit for the coil 30 around the push button is established by a relay switch 45 mechanically connected to the switch 31 so as to be closed when the switch 31 is closed. It will thus be observed that when the motor switch 31 is closed by the push button it is held in closed position as long as the photo-electric cell 22 is activated by a beam of light from the source 23, but when this beam of light is interrupted the motor switch 31 is opened to stop the motor.

A clamp 46 is mounted on the carriage 13 for engagement with the pipe when the carriage has been moved to the working position in order to secure the carriage and the pipe in a predetermined relation during the facing operation. This clamp is shown in conventional form as comprising jaws 47 and 48 slidably mounted in vertical guides 49 and 50 and operable toward and away from each other by means of a screw shaft 51 having right and left-hand threaded sections engaging with suitable nuts on the jaws. This shaft may be operated by means of a driving motor 52 having its armature connected to the supply source 29 through a manually operated reversing switch 53 to engage and disengage the clamps with the pipes.

As previously indicated, the facing tool 10 is mounted on guides 20 and 21 on the carriage so that it can be moved toward and away from the end of the pipe by means of a motor 12 during the machining operation. The facing tool is directly mounted on a suitable carriage 54 containing a driving gear train, not shown, between the facing tool and the driving motor 11 for the facing tool which is also mounted on the carriage 54. As shown, the carriage 54 can be moved on the guides 20 and 21 by means of a screw shaft 55 which is connected through a suitable gear train, not shown, in a gear box 56 to the traverse motor 12. The armatures of the motors 11 and 12 may be connected to the supply source 29 by means of manually operated switches 57 and 58, the latter of which is a reversing switch. The motors 11, 12, 17 and 52 are shown as direct-current motors, and it will be understood that they are provided with shunt-wound field windings (not shown). The fields of the reversible motors 12, 17 and 52 are connected directly to the supply source 29 through suitable switches (not shown). Obviously any suitable type of motor may be used.

In the operation of the system with the carriage 13 in its retracted position as shown in the drawing and the pipe 16 in place the manually operated switch 59 is closed to energize the light source 23 and the push button 32 is also closed momentarily whereupon the coil 30 is energized and the switch 31 closed to start the motor 17, as will be understood from the previous description, in a direction to move the carriage 13 toward the pipe. As the carriage moves forward toward the right as viewed in the drawing the end of the pipe enters the clamp 46 and upon continued movement of the carriage interrupts the light beam from the source 23 to the photo cell 22. This stops the motor 17 with the facing tool 10 in a predetermined position very close to the end of the pipe. In a typical installation the tool was stopped accurately ¼ inch from the end of the pipe.

In order to obtain accurate stopping of the tool in the desired close spaced relation with the end of the pipe, the light source is preferably provided with a reflector (not shown) for reflecting the light to the photo cell in substantially parallel rays. Also the photo-electric cell is preferably enclosed in a casing provided with a relatively narrow opening for the light, such as $\frac{3}{32}$ of an inch, in the direction of traverse movement of the tool. This gives a cut-off of the source of light with small movement of the tool from a position of complete illumination of the photo-electric cell to complete darkness. The operation of the photo-electric cell to stop the motor is thus made very sensitive to the movement of the tool with resultant accuracy in stopping the tool.

The tool is advanced as close as practicable to the end of the pipe so as to decrease as much as possible the required amount of slow traverse in feeding the tool with the motor 11. This is effected by adjusting the tool with relation to the transverse light beam. The adjustment may be such as to bring the tool closer than ¼ inch from the end of the pipe. The spacing will also depend upon the physical condition of the end of the pipe, that is, whether the end is smooth so as to give a definite cut-off of the source of light or jagged in the latter of which case more spacing will necessarily be required.

With the tool thus positioned, the switch 53 is next closed in a direction to start the motor 52 to apply the clamp 46 securely to the pipe. In the next operation the switch 57 is closed to start the facing tool and by means of the switch 58 the motor 12 is started to further advance the tool into engagement with the end of the pipe to effect the facing operation.

Upon the completion of the facing operation the motors 11 and 12 are stopped and the switch 53 is thrown to operate the motor 52 in a direction to release the clamp 46. The switch 60 is then closed to energize the coil 61 and thereby close the reversing switch 62 for the motor 17 whereby the motor is operated in a direction to retract the carriage 13 and move it back to the position indicated in the drawing. When the carriage reaches this position the switch 60 is opened to deenergize the motor 17. Also in resetting the tool the switch 58 is thrown to a position to reverse the motor 12 and move the carriage 54 back to its starting position as indicated in the drawing.

It will be understood that while I have shown manually operated switches for controlling the motors 11, 12 and 52 and also for controlling the reversing of the motor 17, suitable limit switches, such as mechanical limit switches, placed in position to be operated by the various parts upon the completion of their respective movements may be used to automatically control these switches in a desired sequence. With such an automatic system it will be necessary only to press the push button 32 to initiate the facing operation after which the operation is carried out automatically and the apparatus reset for the next operation.

What I claim as new and desire to secure by Letters Patent of the United States is:

1. The combination with a machine tool or the like provided with a tool, means for supporting a workpiece, driving means for moving said tool into a predetermined position with relation to the workpiece, of a light-sensitive device and a source of light therefor mounted for movement with said tool in a predetermined relation therewith so that when said tool is moved into said predetermined spaced relation with the workpiece the transmission of light from said source to said device is interrupted by the workpiece and electroresponsive means controlled by said light-sensitive device for reducing the speed of said driving means when the light to said device is interrupted whereby said tool is moved rapidly to a position dependent upon the position of the workpiece.

2. The combination with a machine tool or the like of a carriage provided with a tool, means for supporting a workpiece, means for driving said carriage to bring said tool into a predetermined position with relation to the workpiece, a light-sensitive device and a source of light therefor secured to said carriage in such predetermined relation to said tool that light from said source passes between said tool and said workpiece to said light sensitive device so that when the carriage is moved to bring said tool into said predetermined position the transmission of light from said source to said device is interrupted by the workpiece and electroresponsive means controlled by said light-sensitive device for reducing the speed of said driving means, said electroresponsive means being controlled to reduce the speed of said driving means when the light to said device is interrupted whereby said tool is moved rapidly to a position dependent upon the position of the workpiece.

3. The combination in a machine tool or the like of a carriage provided with a tool, a light-responsive device on said carriage on one side and in front of said tool, a source of light for said light-responsive device on said carriage on the opposite side of said tool from said light-responsive device, clamping means on said carriage for the workpiece, a support for the workpiece in front of said carriage, means for advancing the carriage toward the workpiece until the light from said source to said device is interrupted by the workpiece and means controlled by said light-responsive device for stopping said advancing means and operated by said light-responsive device in response to interruption of said beam of light to stop said carriage with said tool in a predetermined relation with said workpiece, said position being dependent upon the position of the workpiece.

4. The combination in a pipe facing machine, of a carriage, a facing tool supported on said carriage, a clamp for the pipe on said carriage, supporting means for the pipe, an electric motor for advancing said carriage toward said supporting means to bring said clamp and said tool into a predetermined position with relation to said pipe, said position being dependent upon the position of the pipe, a light-responsive device and a light source therefor mounted on said carriage in a predetermined relation with said facing tool such that light from said source to said light-responsive device is interrupted by the pipe when said facing tool and said clamp are moved to said predetermined relative position, an electromagnetically operated switch for starting said motor to advance said carriage, a manually operated switch for closing a circuit to close said starting switch, a normally closed switch in said circuit, electroresponsive means for opening said switch, means controlled by said light-responsive device for energizing said electroresponsive means and thereby opening said normally closed switch to stop said motor when said light is interrupted, and means for reversing said motor to retract said carriage.

DONALD C. MACKINTOSH.